United States Patent [19]
Otake

[11] Patent Number: 4,774,674
[45] Date of Patent: Sep. 27, 1988

[54] MANUAL OPERATION SYSTEM FOR MACHINE CONTROLLED BY NUMERICAL CONTROL APPARATUS

[75] Inventor: Hiromasa Otake, Tanashi, Japan

[73] Assignee: Fanuc Ltd, Yamanashi, Japan

[21] Appl. No.: 2,756

[22] PCT Filed: Apr. 30, 1986

[86] PCT No.: PCT/JP86/00223
§ 371 Date: Dec. 30, 1986
§ 102(e) Date: Dec. 30, 1986

[87] PCT Pub. No.: WO86/06324
PCT Pub. Date: Nov. 6, 1986

[30] Foreign Application Priority Data
Apr. 30, 1985 [JP] Japan .................................. 60-91207

[51] Int. Cl.⁴ .................................................. B29C 45/76
[52] U.S. Cl. .................................... 364/474; 364/181; 364/188; 318/591
[58] Field of Search ........ 364/181, 188, 189, 191–193, 364/474, 475, 167–171; 318/591

[56] References Cited

U.S. PATENT DOCUMENTS
4,521,845  6/1985  Schwefel ............................. 364/181
4,674,053  6/1987  Bonnai et al. ....................... 364/188

FOREIGN PATENT DOCUMENTS
3606439 12/1986 Fed. Rep. of Germany ...... 364/513

*Primary Examiner*—Jerry Smith
*Assistant Examiner*—Allen MacDonald
*Attorney, Agent, or Firm*—Staas & Halsey

[57] ABSTRACT

Disclosed is a manual operation system for a machine controlled by a numerical control apparatus (1). The same operation pattern as in an automatic operation mode can be manually performed according to the manual operation system.

When a programmable controller central processing unit (6) determines that a manual instruction from selection switches (33a–33g, 34a, 34b) is kept enabled, the machine is controlled according to the manual operation program including a predetermined portion of the automatic operation program, thereby executing the same operation as in the automatic mode from the current position.

5 Claims, 1 Drawing Sheet

MANUAL OPERATION SYSTEM FOR MACHINE CONTROLLED BY NUMERICAL CONTROL APPARATUS

TECHNICAL FIELD

The present invention relates to a manual operation system for a machine controlled by a numerical control apparatus, wherein manual operations can be performed according to the same operation pattern as in automatic operation.

BACKGROUND ART

In a conventional machine controlled by a numerical control apparatus, manual feed in the manual feed mode, i.e., jog feed allows feeding of a machine at a constant speed while a manual feed switch is kept on. For this reason, the operation in the manual feed mode differs from that in the automatic operation mode. Even if the same operation pattern as in automatic operation is required in manual operation, such a requirement cannot be satisfied.

In conventional injection molding machines, especially, in a conventional hydraulic injection molding machine, an actuator such as a hydraulic valve is operated in an identical pattern in both the manual and automatic operation modes. Under this assumption, demand has arisen for causing the injection molding machine controlled by a numerical control apparatus to perform the same operations in both automatic and manual operation modes.

DISCLOSURE OF INVENTION

It is an object of the present invention to provide a manual operation system for a machine controlled by a numerical control apparatus, wherein the same operation pattern as in the automatic operation mode can be performed in the manual operation mode.

In order to achieve the above object of the present invention, there is provided a numerically controlled machine, comprising selection switch means, switch discriminating means for discriminating an actuation state of the selection switch means, and memory means for storing a manual operation program including a predetermined portion of an automatic operation program, wherein the machine can perform the same operation as in the automatic operation mode from a current position according to the manual operation program as long as a manual instruction from the selection switch means is kept enabled.

According to the present invention, since the manual operation program including the predetermined portion of the automatic operation mode is executed upon actuation of the selection switch means, the numerically controlled injection molding machine can be operated manually by the same operation pattern as in the automatic operation mode.

BEST MODE OF CARRYING OUT THE INVENTION

Figure 1:
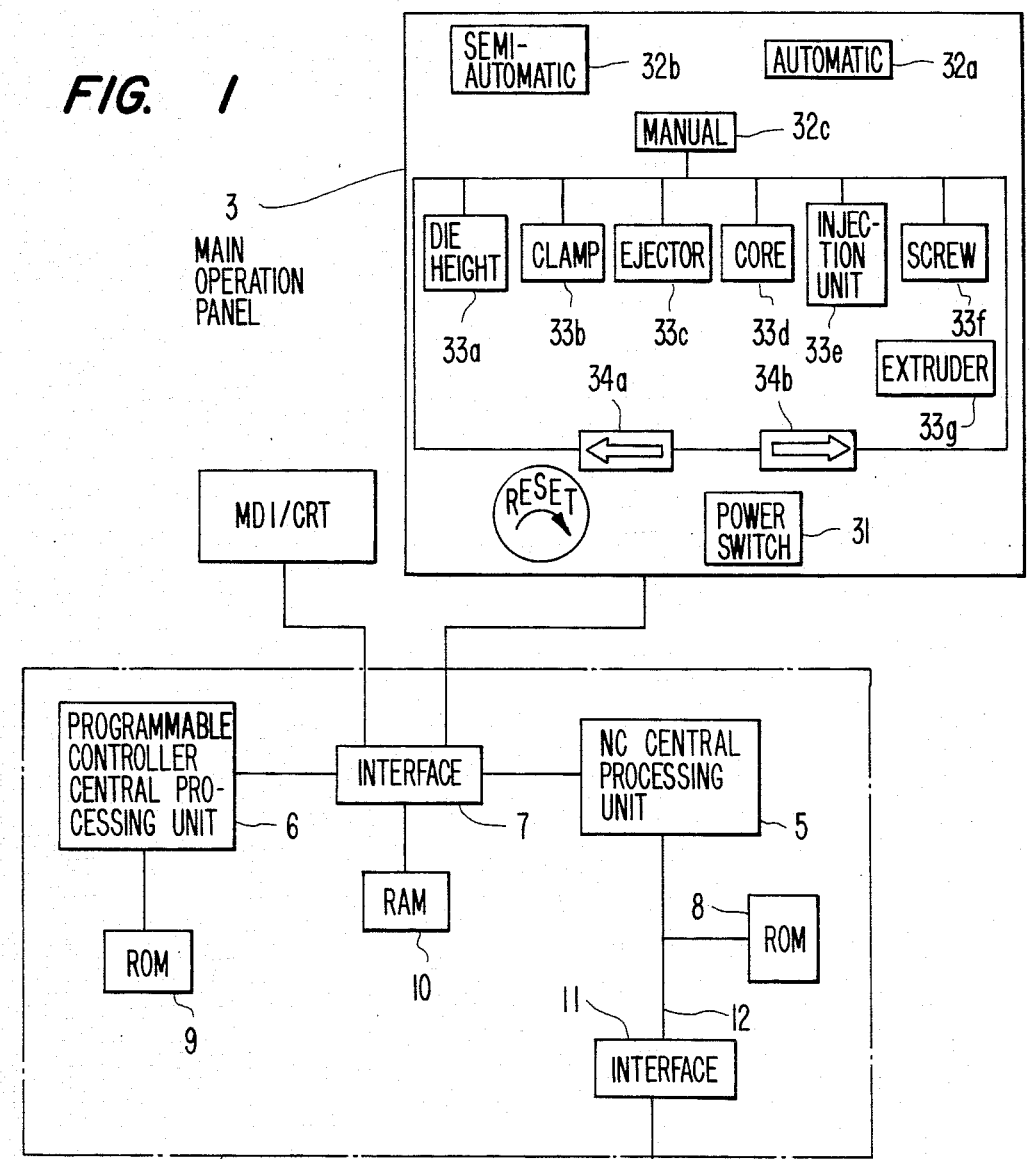
FIG. 1 is a view showing the main part of an injection molding machine to which an embodiment of the present invention is applied.

FIG. 1 shows the construction of the main part of an injection molding machine to which an embodiment of the present invention is applied. A computer built-in numerical controller (to be referred to as a CNC controller) 1 is connected to an operation panel with a display (to be referred to as an MDI/CRT) 2, a main operation panel 3 arranged on the housing of the injection molding machine, and each axis servo circuit 4 for controlling and driving a corresponding one of servo motors for mold clamping, die height adjustment, ejector, injection, metering, and nozzle touch. The main control panel 3 includes a power switch 31, operation mode selection switches 32a to 32c for respectively setting the automatic, semi-automatic, and manual operations, manual operation object selection switches 33a to 33g for selecting mechanisms such as clamp (i.e., a mold clamping mechanism) of the injection molding machine which are set in the manual operation mode, and direction selection switches 34a and 34b for selecting a movement direction of the selected mechanism.

The CNC controller 1 includes an NC central processing unit (to be referred to as an NCCPU) 5 and a programmable controller central processing unit (to be referred to as a PCCPU) 6. The NCCPU 5 and the PCCPU 6 are connected to each other through an interface 7. The NCCPU 5 is connected to a ROM 8 for storing control programs for controlling the entire injection molding machine. The NCCPU 5 is also connected to the servo circuits 4 through a bus 12 and an interface 11. The PCCPU 6 is connected to a ROM 9 for storing a sequence program. The interface 7 is connected to the MDI/CRT 2, the main control panel 3, and a nonvolatile RAM 10. The RAM 10 stores various automatic and manual NC programs such as an automatic operation program of the injection molding machine, a manual operation program for only mold opening operation of the clamp, and a manual operation program for only mold clamping operation of the clamp. The nonvolatile RAM 10 stores various molding conditions such as a mold clamping speed, an injection rate, and a holding pressure, which are set by the use of the MDI/CRT 2. In this embodiment, macro variables are utilized to set and store these molding conditions.

In the stop mode of the injection molding machine, the PCCPU 6 monitors the actuation states of the switches on the main operation panel 3 according to the program sequence stored in the ROM 9 and selects a proper program from the RAM 10 in response to an output signal from the main operation panel 3. The selected program code is set in a selected program register under the control of the PCCPU 6. The PCCPU 6 also sends a start instruction to the NCCPU 5. In response to this instruction, the NCCPU 5 reads out an NC program corresponding to the selected program code from the RAM 10. The readout program is executed to drive all axis servo motors through the corresponding servo circuits 4. During execution of the NC program, the PCCPU 6 monitors the actuation states of the various switches on the main operation panel 3. When a stop instruction is input, the PCCPU 6 sends a stop instruction to the NCCPU 5 so as to interrupt the execution of the program. For example, when the automatic switch 32a is depressed, the PCCPU 6 detects depression of the switch 32a and selects the automatic operation program. The automatic operation program code is written in the register. The NCCPU 5 executes the automatic operation program according to the contents stored in the register. When a manual operation instruction is generated, the PCCPU 6 monitors the manual switch 32c, the manual operation object selection switches 33a to 33g, and the direction selection switches 34a and 34b to determine which switches are depressed. The PCCPU 6 then selects a program stored in the nonvolatile RAM 10 to cause the selected mechanism to perform the same operation as in the automatic operation mode according to each driving direction. The code of this program is set in the register, and the NCCPU 5 executes the selected program according to the code stored in the register.

As an example of manual operation, a case will be described wherein the clamp (the mold clamping mechanism) is manually fed in the mold opening direction.

Figure 2:
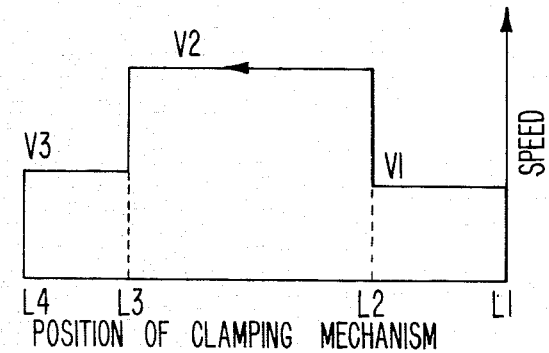
FIG. 2 is a graph showing a mold opening operation pattern according to this embodiment.

The mold opening operation of the clamp is the one (FIG. 2) performed in the automatic operation mode. Mold opening is started from a mold closed position L1 at a low speed V1 and then a high speed V2. The mold opening operation continues at a low speed V3 to a mold opening end position L4. The speed switching positions L1, L2, L3, and L4 and mold opening speeds V1, V2, and V3 are set using macro variables on the operation panel and are stored in the nonvolatile RAM 10. More specifically, the mold closed position L1, the high-speed mold opening start position L2, the low-speed mold opening start position L3, and the mold opening end position L4 are stored at positions of macro variables #500 to #503, respectively. The mold release speed V1, the high-speed mold opening speed V2, and the low-speed mold opening speed V3 are stored at positions of macro variables #504 to #506. The current position of the clamp is stored at a position of a macro variable #5022.

In the stop mode of the injection molding machine, if the operator sequentially depresses the manual selection switch 32c, the clamp switch 33c, and the opening direction switch 34a so as to manually open the molds, the CPUs 5 and 6 are operated as described above. The manual mold opening operation program is selected, and the selected program is executed under the control of the NCCPU 5. The manual mold opening operation program is the one listed below, and the injection molding machine is operated according to this program:

```
10 IF [#5022 LT #501] GOTO 50
20 IF [#5022 LT #502] GOTO 60
30 IF [#5022 LT #503] GOTO 70
40 IF [#5022 GE #503] GOTO 80
50 Y #501; F #504
60 Y #502; F #505
70 Y #503; F #506
80 M 30;
```

As is apparent from the above program sequence, each manual operation program consists of a program (work Nos. 10 to 40) for searching the program execution start addresses according to the current operation position of the injection molding machine, and part of the automatic operation program (corresponding to work Nos. 50 to 70). In manual mold opening operation, if the current clamp position represented by the storage content of the macro variable #5022 is smaller than the value represented by the high-speed mold opening position L1 stored at the address of macro variable #501, the program jumps to work number 50, and the operations in work No. 50 and the subsequent numbers are performed. More specifically, mold opening continues from the current clamp position to the high-speed mold opening position L2 (#501) at the mold release speed V1 (#504). Mold opening is then performed up to the low-speed mold opening position L3 (#502) at the high-speed mold opening speed V2 (#505) and then up to the mold opening end position L4 (#503) at the low-speed mold opening speed V3 (#506). The program is then ended. This operation pattern is the same as the mold opening operation pattern based on the automatic operation program.

If the current clamp position represents a value larger than that represented by the high-speed mold opening start position L2 (#501) and at the same time smaller than that represented by the low-speed mold opening start position L3 (#502), the program jumps to work No. 60, and the instructions in work Nos. 60 to 80 are performed. However, if the current clamp position falls within the range between the low-speed mold opening start position L3 (#502) and the mold opening end position L4 (#503), the program jumps to work No. 70, and the instructions in word Nos. 70 and 80 are executed. However, if the current clamp position represents a value larger than that represented by the mold opening end position L4 (#503), the program jumps to work No. 80, and the instruction at this address is executed. The program is then ended.

The above embodiment exemplifies the case of an injection molding machine controlled by the numerical control apparatus. However, the present invention is also applicable to a machine such as a robot controlled by a numerical control apparatus.

I claim:

1. A manual operation system for a machine having a plurality of operating sections, comprising:
    selection switch means, including selection switches each associated with a corresponding one of the plurality of operating sections, for providing output signals corresponding to actuation states of said selection switches; and
    a numerical control apparatus for controlling the machine, said numerical control apparatus including:
    switch discriminating means for monitoring said output signals and for discriminating an actuation state of individual ones of said selection switches;
    memory means for storing a plurality of manual operation programs;
    controlling means for controlling an associated one of the plurality of operating sections in accordance with an operating position of said associated one operating section and a manual operation program corresponding to said operating position and in the same manner as a corresponding automatic operation program;
    initiating means for initiating operation of said controling means and for specifying said corresponding manual operation program on the basis of an operating position of said associated one operating section and in accordance with said discrimination of said switch discriminating means.

2. A system according to claim 1, wherein the machine controlled by the numerical control apparatus is an injection molding machine.

3. A system according to claim 1, wherein at least one of the plurality of operating sections of the machine is operable in plural operating directions, said selection switch means includes:

at least one direction selection switch for selecting an operating direction to which said at least one operating section is to be operated;

said memory means includes means for storing plural manual operation progams each of which is executed for operating said at least one operating section in an associated one of the plural operating directions; and said numerical control apparatus being operable to read out and execute one of the plural manual operation programs selected by one of said selection switches and said at least one direction selection switch.

4. A system according to claim 1, wherein said controlling means includes means for performing multi-stage control of an associated one of the plurality of operating sections in accordance with its operation position.

5. A manual operation system for an injection molding machine having a plurality of servomotors for driving a plurality of axes of the machine, at least one of the plurality of servomotors associated with at least one of the plurality of axes being operable in plural operating directions, comprising:

a main operation panel means mounted on the injection molding machine, including selection switches each corresponding to an associated one of the plurality of axes and including at least one direction selection switch for selecting an operating direction to which the at least one servomotor is to be operated along the at least one axis, for providing output signals corresponding to actuation states of said selection and direction switches; and a numerical control apparatus for controlling the servomotors, said numerical control apparatus including:

switch discriminating means for monitoring said output signals and for discriminating an actuation state of said selection and direction switches of said main operation panel means;

memory means for storing a plurality of manual operation programs;

controlling means for performing multi-stage control of the at least one axis in the corresponding one of the plural operating directions, in accordance with an operating position in the at least one axis and in accordance with a series of instructions respectively stored in a plurality of addresses of said memory means corresponding to one of said manual operation programs;

initiating means for initiating operation of said controlling means and for specifying said series of instructions on the basis of an operating position in the at least one axis and in response to said discrimination of said switch discriminating means.

* * * * *